(12) United States Patent
Imagawa et al.

(10) Patent No.: US 11,999,824 B2
(45) Date of Patent: Jun. 4, 2024

(54) COMPOSITION FOR OPTICAL MATERIAL AND OPTICAL MATERIAL

(71) Applicant: MITSUBISHI GAS CHEMICAL COMPANY, INC., Tokyo (JP)

(72) Inventors: Yousuke Imagawa, Tokyo (JP); Hiroshi Horikoshi, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 595 days.

(21) Appl. No.: 17/271,106

(22) PCT Filed: Aug. 21, 2019

(86) PCT No.: PCT/JP2019/032529
§ 371 (c)(1),
(2) Date: Feb. 24, 2021

(87) PCT Pub. No.: WO2020/050013
PCT Pub. Date: Mar. 12, 2020

(65) Prior Publication Data
US 2021/0253798 A1 Aug. 19, 2021

(30) Foreign Application Priority Data
Sep. 7, 2018 (JP) .................. 2018-168144

(51) Int. Cl.
*C08G 75/06* (2006.01)
*G02B 1/04* (2006.01)

(52) U.S. Cl.
CPC ............. *C08G 75/06* (2013.01); *G02B 1/041* (2013.01)

(58) Field of Classification Search
None
See application file for complete search history.

(56) References Cited

U.S. PATENT DOCUMENTS

| | | | |
|---|---|---|---|
| 2004/0026658 A1* | 2/2004 | Yoshimura | C08G 18/7642 528/48 |
| 2008/0103230 A1* | 5/2008 | Jallouli | C07D 495/10 549/39 |
| 2018/0265638 A1 | 9/2018 | Namiki et al. | |
| 2020/0024450 A1 | 1/2020 | Nishimori et al. | |

FOREIGN PATENT DOCUMENTS

| | | |
|---|---|---|
| JP | 05-279321 A | 10/1993 |
| JP | 09-110979 A | 4/1997 |
| JP | 2002-040201 A | 2/2002 |
| JP | 2003-233036 A | 8/2003 |
| JP | 2004-175726 A | 6/2004 |
| JP | 2013-018741 A | 1/2013 |
| JP | 2017-114972 A | 6/2017 |
| WO | 2017/098798 A1 | 6/2017 |
| WO | 2018/150950 A1 | 8/2018 |

OTHER PUBLICATIONS

International Search Report issued in International Pat. Appl. No. PCT/JP2019/032529, dated Nov. 12, 2019, along with an English translation thereof.

Written Opinion of the International Searching Authority issued in International Pat. Appl. No. PCT/JP2019/032529, dated Nov. 12, 2019, along with an English translation thereof.

* cited by examiner

*Primary Examiner* — Megan Mcculley

(74) *Attorney, Agent, or Firm* — GREENBLUM & BERNSTEIN, P.L.C.

(57) ABSTRACT

The present application provides a composition for an optical material containing a compound (a) and/or a compound (b) and a compound (c) which are described below. The proportion of the compound (a) and/or the compound (b) is 0.001-30.0% by mass. The compound (a) is a compound represented by formula (1). The compound (b) is a compound represented by formula (2). The compound (c) is an episulfide compound.

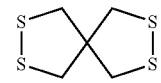

(1)

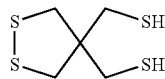

(2)

6 Claims, No Drawings

COMPOSITION FOR OPTICAL MATERIAL AND OPTICAL MATERIAL

TECHNICAL FIELD

The present invention relates to a composition for optical materials, etc., and particularly relates to a composition for optical materials, etc. suitable for an optical material for a plastic lens, a prism, an optical fiber, an information recording substrate, a filter or the like, in particular for a plastic lens.

BACKGROUND ART

Plastic lenses are lightweight, highly tough and easy to be dyed. Properties particularly required for plastic lenses are: low specific gravity; high transparency; low yellowness; high refractive index and high Abbe number as optical properties; high heat resistance; high strength; and the like. A high refractive index allows a lens to be thinner, and a high Abbe number reduces the chromatic aberration of a lens.

Recently, many organic compounds having a sulfur atom for providing a high refractive index and a high Abbe number have been reported. Among such compounds, polyepisulfide compounds having a sulfur atom are known to provide a good balance between the refractive index and the Abbe number (Patent Document 1). High refractive indexes of 1.7 or higher were achieved by optical materials obtained from polyepisulfide compounds of these inventions. However, it has been desired to provide a material having a higher refractive index. An optical material obtained by using a composition for optical materials containing an organic compound having a cyclic skeleton containing a sulfur, selenium or tellurium atom was proposed, and a refractive index of 1.73 or higher was achieved thereby (Patent Document 2).

However, such optical materials obtained by using a composition for optical materials having a high refractive index have problems that a monomer is not easily synthesized, resulting in a high cost, that mold release characteristics after curing is insufficient and lenses are easily broken at the time of demolding, and that there is still a room for improvement of heat resistance of cured lenses.

PRIOR ART DOCUMENTS

Patent Documents

Patent Document 1: Japanese Laid-Open Patent Publication No. H09-110979
Patent Document 2: Japanese Laid-Open Patent Publication No. 2002-40201

SUMMARY OF THE INVENTION

Problems to be Solved by the Invention

The problem to be solved by the present invention is to provide a composition for optical materials having a high refractive index, which ensures higher heat resistance and sufficient mold release characteristics in an optical material obtained by using the composition for optical materials, and an optical material obtained by using the same.

Means for Solving the Problems

The present inventors diligently made researches in order to solve the problem and solved the problem regarding further improvement of heat resistance and improvement of mold release characteristics by polymerizing and curing a composition for optical materials containing a compound (a) and/or a compound (b) and a compound (c) described below, and thus the present invention was achieved.

The compound (a) is a compound represented by formula (1).
The compound (b) is a compound represented by formula (2).
The compound (c) is an episulfide compound.

(1)

(2)

Advantageous Effect of the Invention

According to the present invention, it is possible to provide a composition for optical materials having a high refractive index, which ensures a low cost, sufficient mold release characteristics after curing and higher heat resistance of cured resin in an optical material obtained by using the composition for optical materials, and an optical material obtained by using the same.

Embodiments for Carrying Out the Invention

Hereinafter, raw materials to be used in the present invention, i.e., the compounds (a), (b) and (c) will be described in detail.

The compound (a) to be used in the present invention is a compound represented by formula (1):

(1)

The compound (a) can be obtained by synthesis according to a publicly-known technique. Examples of such techniques include the technique described in Japanese Laid-Open Patent Publication No. H05-279321.

The compound (b) to be used in the present invention is a compound represented by formula (2):

(2)

The compound (b) can be obtained by reduction according to a publicly-known technique in the process of obtaining the compound (a) or after obtaining the compound (a).

The episulfide compound (c) to be used in the present invention includes all episulfide compounds. Specific examples of the episulfide compound (c) are classified into a compound having a chain aliphatic skeleton, a compound having a branched aliphatic skeleton, a compound having an aliphatic cyclic skeleton and a compound having an aromatic skeleton and listed below.

Examples of the compound having a chain aliphatic skeleton include a compound represented by formula (3) below.

(3)

(In the formula, m represents an integer of 0 to 4, and n represents an integer of 0 to 2.)

Examples of the compound having a branched aliphatic skeleton include a compound represented by formula (4), (5) or (6) below.

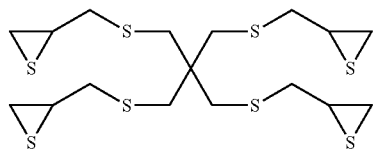

(4)

(5)

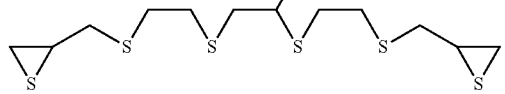

(6)

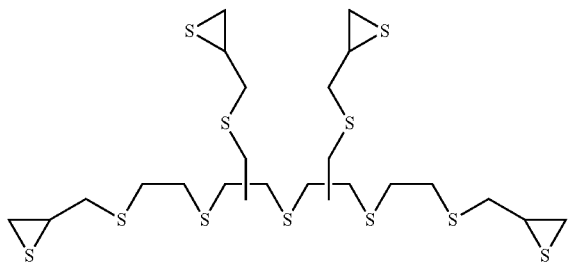

Examples of the compound having an aliphatic cyclic skeleton include a compound represented by formula (7) or (8) below.

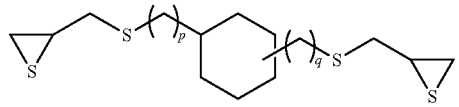

(7)

(In the formula, p and q each independently represent an integer of 0 to 4.)

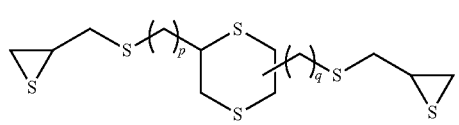

(8)

(In the formula, p and q each independently represent an integer of 0 to 4.)

Examples of the compound having an aromatic skeleton include a compound represented by formula (9), (10) or (11) below.

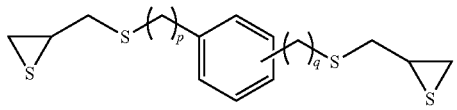

(9)

(In the formula, p and q each independently represent an integer of 0 to 4.)

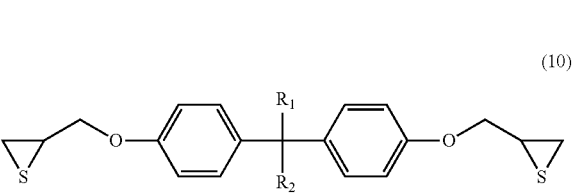

(10)

(In the formula, $R_1$ and $R_2$ each independently represent a hydrogen atom, a methyl group, an ethyl group or a phenyl group.)

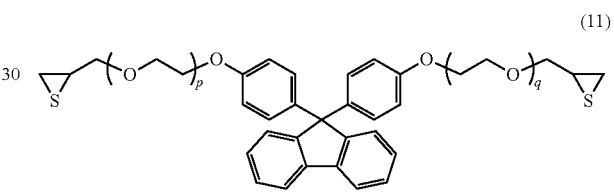

(11)

(In the formula, p and q each independently represent an integer of 0 or 1.)

Specific examples of the compound of formula (3) include bis(β-epithiopropyl)sulfide (n=0 in formula (3) above), bis((β-epithiopropyl)disulfide (m=0 and n=1 in formula (3) above), bis((β-epithiopropylthio)methane (m=1 and n=1 in formula (3) above), 1,2-bis((β-epithiopropylthio)ethane (m=2 and n=1 in formula (3) above), 1,3-bis((β-epithiopropylthio)propane (m=3 and n=1 in formula (3) above), 1,4-bis((β-epithiopropylthio)butane (m=4 and n=1 in formula (3) above) and bis((β-epithiopropylthioethyl)sulfide (m=2 and n=2 in formula (3) above).

Specific examples of the compound of formula (7) include 1,3- or 1,4-bis((β-epithiopropylthio)cyclohexane (p=0 and q=0 in formula (7) above) and 1,3- or 1,4-bis((β-epithiopropylthiomethyl)cyclohexane (p=1 and q=1 in formula (7) above).

Specific examples of the compound of formula (8) include 2,5-bis((β-epithiopropylthio)-1,4-dithiane (p=0 and q=0 in formula (8) above) and 2,5-bis(β-epithiopropylthioethylthiomethyl)-1,4-dithiane (p=1 and q=1 in formula (8) above).

Specific examples of the compound of formula (9) include 1,3- or 1,4-bis((β-epithiopropylthio)benzene (p=0 and q=0 in formula (9) above) and 1,3- or 1,4-bis(β-epithiopropylthiomethyl)benzene (p=1 and q=1 in formula (9) above).

Specific examples of the compound of formula (10) include a compound in which both $R_1$ and $R_2$ are a hydrogen atom and a compound in which both $R_1$ and $R_2$ are a methyl group.

Specific examples of the compound of formula (11) include a compound, wherein p=0 and q=0 in formula (11) above, and a compound, wherein p=1 and q=1 in formula (11) above.

These substances may be used solely, or two or more of them may be used as a mixture.

Among them, preferred are the compound having a chain aliphatic skeleton represented by formula (3) above and the compound having a branched aliphatic skeleton represented by formula (4), (5) or (6) above, particularly preferred are bis(β-epithiopropyl)sulfide (n=0 in formula (3) above), bis (β-epithiopropyl)disulfide (m=0 and n=1 in formula (3) above) and the compound represented by formula (4), more preferred are bis(β-epithiopropyl)sulfide (n=0 in formula (3) above) and the compound represented by formula (4), and most preferred is the compound represented by formula (4).

Examples of the compound (c) to be used in the present invention are described above, but the compound (c) is not limited to these examples. Further, as the compound (c), these substances may be used solely, or two or more of them may be used as a mixture.

The ratio of the compound (a) and/or the compound (b) in the composition for optical materials of the present invention is preferably 0.001 to 30.0% by mass, more preferably 0.005 to 10.0% by mass, and particularly preferably 0.01 to 5.0% by mass. When the ratio of the compound (a) and/or the compound (b) is less than 0.001% by mass, sufficient effects may not be obtained. When the ratio is more than 30.0% by mass, the viscosity of a preparation solution is increased and lens molding may not be easily performed.

The composition for optical materials of the present invention may contain a polythiol other than the compound represented by formula (2) according to need. The polythiol is a thiol compound having at least two mercapto groups per one molecule. The polythiol has the effect of improving the color tone of resin obtained from the composition for optical materials of the present invention at the time of heating.

The polythiol to be used in the present invention is not particularly limited, but in terms of being highly effective for the improvement of the color tone, preferred specific examples thereof include 1,2,6,7-tetramercapto-4-thiaheptane, methanedithiol, (sulfanylmethyldisulfanyl)methanethiol, bis(2-mercaptoethyl)sulfide, 2,5-bis(mercaptomethyl)-1,4-dithiane, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, tetramercaptopentaerythritol, 1,3-bis(mercaptomethyl)benzene, 1,4-bis(mercaptomethyl)benzene and thiiranemethanethiol. Particularly preferred are bis(2-mercaptoethyl)sulfide, 1,2,6,7-tetramercapto-4-thiaheptane, 1,2-bis(2-mercaptoethylthio)-3-mercaptopropane and 1,3-bis (mercaptomethyl)benzene, and most preferred are bis(2-mercaptoethyl)sulfide and 1,2,6,7-tetramercapto-4-thiaheptane. As these materials, a commercially-available product or a product obtained by synthesis according to a publicly-known method can be used. Further, two or more of these materials can be used in combination.

In the composition for optical materials of the present invention, the ratio of the polythiol other than the compound represented by formula (2) is preferably 0 to 25% by mass (e.g., 0.1 to 25% by mass), more preferably 0 to 20% by mass (e.g., 0.5 to 20% by mass), even more preferably 0 to 10% by mass (e.g., 0.5 to 10% by mass), and particularly preferably 0 to 5% by mass (e.g., 0.5 to 5% by mass) relative to the total amount of the composition.

The composition for optical materials of the present invention may contain sulfur and/or 1,2,3,5,6-pentathiepane (lenthionine) according to need. Sulfur and/or 1,2,3,5,6-pentathiepane have the effect of improving the refractive index of the optical material (resin) obtained from the composition for optical materials of the present invention.

The sulfur to be used in the present invention may be in any form. Specific examples of the sulfur include finely-powdered sulfur, colloidal sulfur, precipitated sulfur, crystalline sulfur and sublimed sulfur, and from the viewpoint of the dissolution rate, finely-powdered sulfur having fine particles is preferred.

It is preferred that the particle size (diameter) of the sulfur to be used in the present invention is less than 10 mesh. When the particle size of the sulfur is more than 10 mesh, it is difficult to dissolve the sulfur completely. The particle size of the sulfur is more preferably less than 30 mesh, and most preferably less than 60 mesh.

The purity of the sulfur to be used in the present invention is preferably at least 98%, more preferably at least 99.0%, even more preferably at least 99.5%, and most preferably at least 99.9%. When the purity of the sulfur is at least 98%, the color tone of the obtained optical material is improved compared to the case of lower than 98%.

As the sulfur satisfying the above-described conditions, a commercially-available product can be easily obtained and suitably used.

The method for obtaining 1,2,3,5,6-pentathiepane is not particularly limited. A commercially-available product may be used as 1,2,3,5,6-pentathiepane. Alternatively, 1,2,3,5,6-pentathiepane may be collected and extracted from natural materials such as crude oil, animals and plants or may be synthesized according to a publicly-known method.

Examples of synthesis methods include those described in: N. Takeda et al., Bull. Chem. Soc. Jpn., 68, 2757 (1995); F. Feher et al., Angew. Chem. Int. Ed., 7, 301 (1968); G. W. Kutney et al., Can. J. Chem, 58, 1233 (1980); etc.

In the composition for optical materials of the present invention, the ratio of the sulfur and/or 1,2,3,5,6-pentathiepane is preferably 0 to 40% by mass (e.g., 1 to 40% by mass), more preferably 0 to 30% by mass (e.g., 5 to 30% by mass or 10 to 30% by mass), even more preferably 0 to 25% by mass (e.g., 5 to 25% by mass), and particularly preferably 0 to 20% by mass (e.g., 5 to 20% by mass) relative to the total amount of the composition.

When obtaining an optical material by polymerizing and curing the composition for optical materials of the present invention, it is preferred to add a polymerization catalyst. As the polymerization catalyst, amines, phosphines, onium salts, etc. may be used, but onium salts are particularly preferred. Among them, quaternary ammonium salts, quaternary phosphonium salts, tertiary sulfonium salts and secondary iodonium salts are preferred. Among them, quaternary ammonium salts and quaternary phosphonium salts, which have good compatibility with the composition for optical materials, are more preferred, and quaternary phosphonium salts are even more preferred. More preferred examples of the polymerization catalyst include quaternary ammonium salts such as tetra-n-butylammonium bromide, triethylbenzyl ammonium chloride, cetyldimethylbenzyl ammonium chloride and 1-n-dodecyl pyridinium chloride and quaternary phosphonium salts such as tetra-n-butylphosphonium bromide and tetraphenyl phosphonium bromide. Among them, tetra-n-butylammonium bromide, triethylbenzyl ammonium chloride and tetra-n-butylphosphonium bromide are even more preferred polymerization catalysts.

The amount of the polymerization catalyst to be added cannot be determined categorically because it varies depending on the components of the composition, the mixing ratio and the method for polymerization and curing, but the amount is usually 0.0001 to 10 parts by mass, preferably 0.001 to 5 parts by mass, more preferably 0.01 to 1 part by mass, and most preferably 0.01 to 0.5 part by mass when the total amount of the composition for optical materials is 100 parts by mass. When the amount of the polymerization catalyst to be added is more than 10 parts by mass, the composition may be rapidly polymerized. When the amount of the polymerization catalyst to be added is less than 0.0001 part by mass, the composition for optical materials may be insufficiently cured, resulting in poor heat resistance.

Moreover, in the production of the optical material according to the production method of the present invention, it is surely possible to add additives such as an ultraviolet absorber, a blueing agent and a pigment to the composition for optical materials to further improve practicability of the optical material obtained.

Preferred examples of the ultraviolet absorber include benzotriazole-based compounds, and 2-(2-hydroxy-5-methylphenyl)-2H-benzotriazol, 5-chloro-2-(3,5-di-tert-butyl-2-hydroxyphenyl)-2H-benzotriazol, 2-(2-hydroxy-4-octylphenyl)-2H-benzotriazol, 2-(2-hydroxy-4-methoxyphenyl)-2H-benzotriazol, 2-(2-hydroxy-4-ethoxyphenyl)-2H-benzotriazol, 2-(2-hydroxy-4-butoxyphenyl)-2H-benzotriazol, 2-(2-hydroxy-4-octyloxyphenyl)-2H-benzotriazol and 2-(2-hydroxy-5-t-octylphenyl)-2H-benzotriazol are particularly preferred compounds.

The amount of these ultraviolet absorbers to be added is usually 0.01 to 5 parts by mass when the total amount of the composition for optical materials is 100 parts by mass.

When polymerizing and curing the composition for optical materials, for the purpose of extension of the pot life, dispersion of heat generated by polymerization, etc., a polymerization modifier may be added according to need. Examples of the polymerization modifier include halides of groups 13 to 16 of the long form of the periodic table. Among them, halides of silicon, germanium, tin and antimony are preferred, and chlorides of germanium, tin and antimony, which have an alkyl group, are more preferred. Further, dibutyltin dichloride, butyltin trichloride, dioctyltin dichloride, octyltin trichloride, dibutyldichlorogermanium, butyltri chloro germanium, diphenyldichlorogermanium, phenyltrichlorogermanium and triphenylantimony dichloride are even more preferred, and dibutyltin dichloride is the most preferred compound. These polymerization modifiers may be used solely, or two or more of them may be used in combination.

The amount of the polymerization modifier to be added is 0.0001 to 5.0 parts by mass, preferably 0.0005 to 3.0 parts by mass, and more preferably 0.001 to 2.0 parts by mass when the total amount of the composition for optical materials is 100 parts by mass. When the amount of the polymerization modifier to be added is less than 0.0001 part by mass, sufficient pot life cannot be ensured in the obtained optical material, and when the amount of the polymerization modifier to be added is more than 5.0 parts by mass, the composition for optical materials may not be sufficiently cured, and the heat resistance of the obtained optical material may be reduced.

The composition for optical materials thus obtained is injected into a mold or the like and polymerized to obtain an optical material.

At the time of cast-molding the composition for optical materials of the present invention, it is preferred to filter and remove impurities using, for example, a filter having a pore diameter of about 0.1 to 5 μm in terms of improving the quality of the optical material of the present invention.

The composition for optical materials of the present invention is usually polymerized as described below. Specifically, the curing time is usually 1 to 100 hours, and the curing temperature is usually −10° C. to 140° C. The polymerization is conducted by carrying out a step of retaining the composition at a predetermined polymerization temperature for a predetermined amount of time, a step of increasing the temperature at a rate of 0.1° C. to 100° C./h and a step of decreasing the temperature at a rate of 0.1° C. to 100° C./h, or a combination of these steps.

Further, it is preferred to anneal the obtained optical material at a temperature of 50 to 150° C. for about 10 minutes to 5 hours after curing is completed in terms of eliminating distortion of the optical material of the present invention. Moreover, the obtained optical material may be subjected to a surface treatment such as dyeing, hard coating, impact-resistant coating, antireflection treatment and imparting antifog properties according to need.

The optical material of the present invention can be suitably used as an optical lens.

EXAMPLES

Hereinafter, the present invention will be specifically described by way of illustrative examples, but the present invention is not limited thereto. Note that evaluation was carried out in manners described below.

[Mold release characteristics]

10 lenses of −4D having a diameter of 70 mm and a central thicknesses of 1.0 mm were prepared, and mold release characteristics thereof were evaluated. The case where 10 lenses were successfully removed from the mold was rated as A. The case where 9 lenses were successfully removed from the mold was rated as B. The case where 8 lenses were successfully removed from the mold was rated as C. The case where 7 lenses or less were successfully removed from the mold was rated as D. A and B are regarded as acceptable.

[Measurement of heat resistance (Tg) of optical material]

A sample was cut to have a thickness of 3 mm, and the TMA measurement (Seiko Instruments Inc., TMA/SS6100) was carried out by adding 10 g of weight to a pin ((p: 0.5 mm) and elevating the temperature from 30° C. at a rate of 10° C./min to measure the softening point. The case where the softening point was 70° C. or higher was rated as A. The case where the softening point was 50° C. or higher and lower than 70° C. was rated as B. The case where the softening point was lower than 50° C. was rated as C. A and B are regarded as acceptable.

Synthesis Example 1

The compound (a) was obtained according to the technique described in Japanese Laid-Open Patent Publication No. H05-279321. Next, 15 g of the compound (a) was dissolved in a mixed solvent consisting of 100 ml of toluene and 150 ml of methanol. Subsequently, 2.8 g of sodium borohydride was added thereto while stirring at 5° C. After stirring for 1 hour, 150 ml of water was added thereto and a toluene layer was extracted. After that, washing with water was carried out, toluene was distilled away, and then purification was carried out using a silica gel column, thereby obtaining 4.5 g of the compound (b).

Example 1

To 99.999 parts by mass of tetrakis((β-epithiopropylthiomethyl)methane (compound represented by formula (4)) as the compound (c), 0.001 part by mass of the compound (a) synthesized in Synthesis Example 1 and 0.05 part by mass of tetra-n-butylphosphonium bromide as a polymerization catalyst were added, and then the mixture was well mixed homogeneously. Next, the obtained mixture was subjected to the deaeration treatment at a vacuum degree of 1.3 kPa and then injected into a mold. It was heated at 30° C. for 10 hours, then the temperature was elevated to 100° C. over 10 hours at a constant rate, and finally, it was heated at 100° C. for 1 hour to be polymerized and cured. After cooling, the obtained product was released from the mold and annealed at 120° C. for 30 minutes, thereby obtaining a molded plate. The evaluation results regarding mold release characteristics and heat resistance are shown in Table 1.

Examples 2-8 and Comparative Examples 1-2

The process was carried out in a manner similar to that in Example 1, except that the composition was as shown in Table 1. The evaluation results are shown in Table 1.

TABLE 1

| Examples | Compound (parts by mass) | | | Lenthionine | Mold release characteristics | Heat resistance |
|---|---|---|---|---|---|---|
| | (a) | (b) | (c) | | | |
| Example 1 | 0.001 | 0 | 99.999 | Not used | B | B |
| Example 2 | 0.008 | 0.002 | 99.99 | Not used | B | A |
| Example 3 | 0.08 | 0.02 | 99.9 | Not used | A | A |
| Example 4 | 0.7 | 0.2 | 99.1 | Not used | A | A |
| Example 5 | 2.7 | 0.2 | 97.1 | Not used | A | A |
| Example 6 | 4.5 | 4.5 | 91.0 | Not used | B | A |
| Example 7 | 15.0 | 10.0 | 75.0 | Not used | B | B |
| Example 8 | 0 | 0.001 | 99.999 | Not used | B | B |
| Comparative Example 1 | 0 | 0 | 99.999 | 0.001 | C | A |
| Comparative Example 2 | 0 | 0 | 90.0 | 10.0 | C | C |

Example 9

To 99.999 parts by mass of bis(β-epithiopropyl)sulfide (compound represented by formula (3), wherein n=0) as the compound (c), 0.001 part by mass of the compound (a) synthesized in Synthesis Example 1 and 0.05 part by mass of tetra-n-butylphosphonium bromide as a polymerization catalyst were added, and then the mixture was well mixed homogeneously. Next, the obtained mixture was subjected to the deaeration treatment at a vacuum degree of 1.3 kPa and then injected into a mold. It was heated at 30° C. for 10 hours, then the temperature was elevated to 100° C. over 10 hours at a constant rate, and finally, it was heated at 100° C. for 1 hour to be polymerized and cured. After cooling, the obtained product was released from the mold and annealed at 120° C. for 30 minutes, thereby obtaining a molded plate. The evaluation results regarding mold release characteristics and heat resistance are shown in Table 2.

Examples 10-16 and Comparative Examples 3-4

The process was carried out in a manner similar to that in Example 9, except that the composition was as shown in Table 2. The evaluation results are shown in Table 2.

TABLE 2

| Examples | Compound (parts by mass) | | | Lenthionine | Mold release characteristics | Heat resistance |
|---|---|---|---|---|---|---|
| | (a) | (b) | (c) | | | |
| Example 9 | 0.001 | 0 | 99.999 | Not used | B | B |
| Example 10 | 0.008 | 0.002 | 99.99 | Not used | B | A |
| Example 11 | 0.07 | 0.03 | 99.9 | Not used | A | A |
| Example 12 | 0.8 | 0.1 | 99.1 | Not used | A | A |
| Example 13 | 2.6 | 0.3 | 97.1 | Not used | A | A |
| Example 14 | 4.8 | 4.2 | 91.0 | Not used | B | A |
| Example 15 | 15.0 | 10.0 | 75.0 | Not used | B | B |
| Example 16 | 0 | 0.001 | 99.999 | Not used | B | B |
| Comparative Example 3 | 0 | 0 | 99.999 | 0.001 | C | A |
| Comparative Example 4 | 0 | 0 | 90.0 | 10.0 | C | C |

The invention claimed is:

1. A composition for optical materials, the composition comprising a compound (a) and/or a compound (b), the composition further comprising a compound (c), wherein:

the compound (a) is a compound represented by formula (1):

the compound (b) is a compound represented by formula (2):

and the compound (c) is an episulfide compound.

2. The composition for optical materials according to claim 1, wherein an amount of the compound (a) and/or the compound (b) is 0.001 to 30.0% by mass.

3. A method for producing an optical material, which comprises:

adding a polymerization catalyst to the composition for optical materials according to claim 2 in an amount of 0.0001 to 10 parts by mass relative to 100 parts by mass of the composition for optical materials, and polymerizing and curing the resultant materials.

4. A method for producing an optical material, which comprises:
  adding a polymerization catalyst to the composition for optical materials according to claim 1 in an amount of 0.0001 to 10 parts by mass relative to 100 parts by mass of the composition for optical materials, and
  polymerizing and curing the resultant materials.

5. An optical material obtained by the method according to claim 4.

6. An optical lens made of the optical material according to claim 5.

* * * * *